Figure 1:
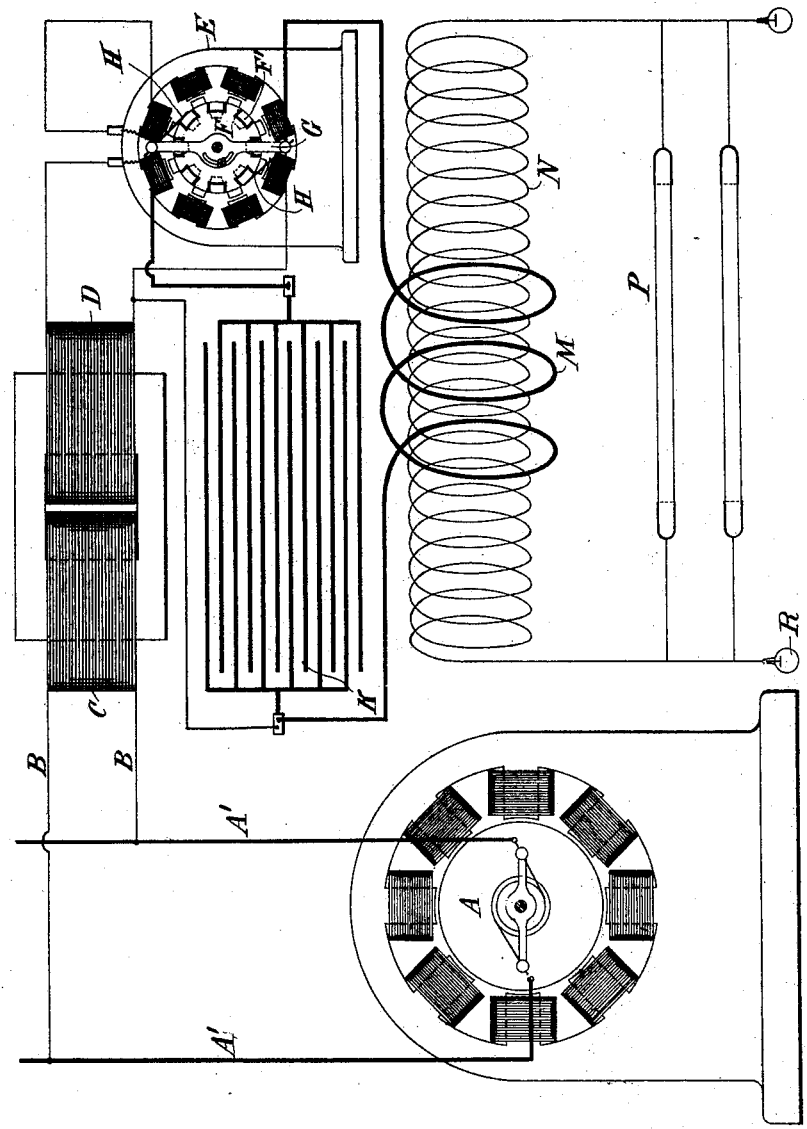

(No Model.) 2 Sheets—Sheet 1.

N. TESLA.
METHOD OF AND APPARATUS FOR PRODUCING CURRENTS OF HIGH FREQUENCY.

No. 568,179. Patented Sept. 22, 1896.

WITNESSES
Drury N. Cooper
Edwin B. Hopkinson

INVENTOR
Nikola Tesla
BY
Kerr, Curtis & Page.
ATTORNEYS

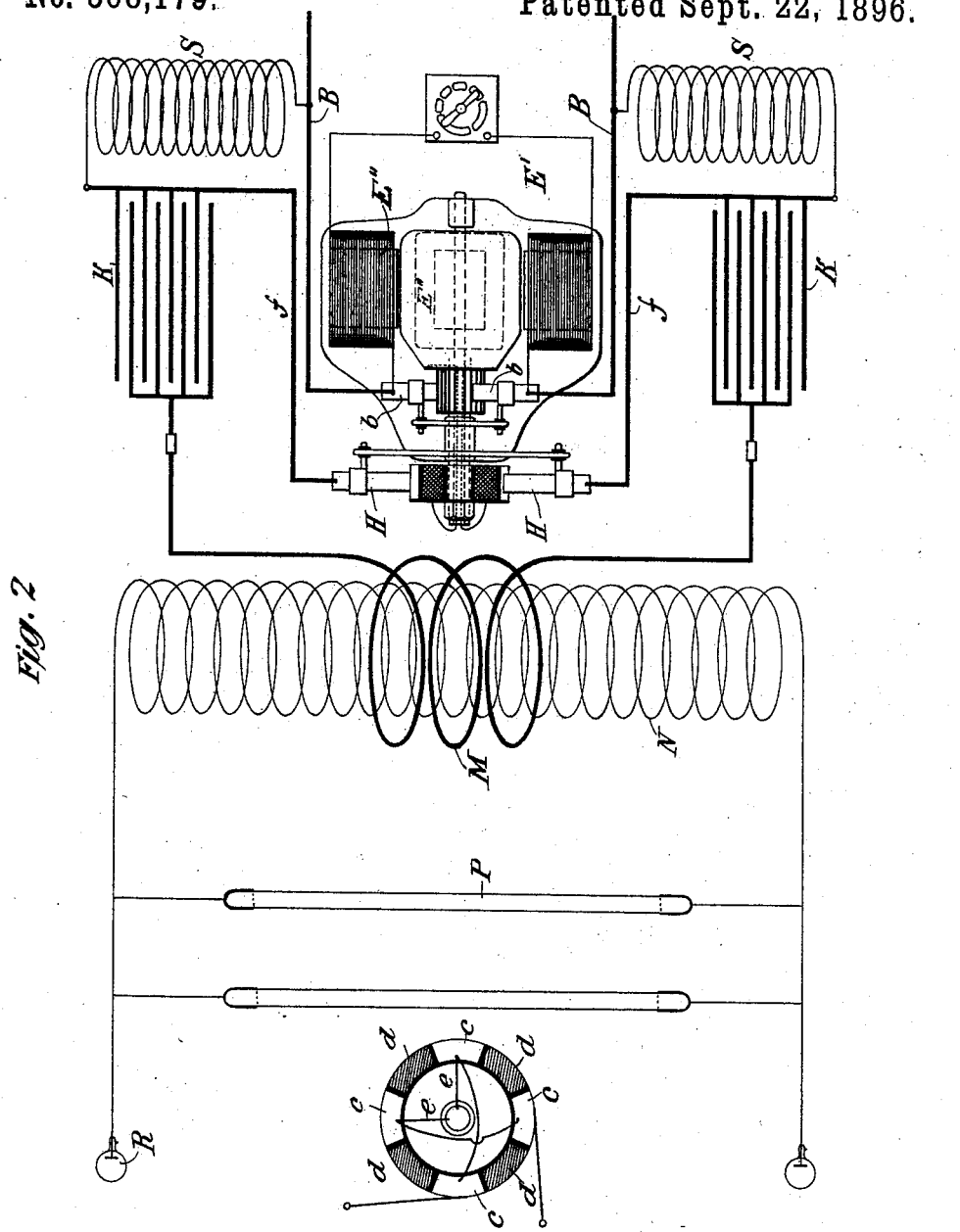

UNITED STATES PATENT OFFICE.

NIKOLA TESLA, OF NEW YORK, N. Y.

METHOD OF AND APPARATUS FOR PRODUCING CURRENTS OF HIGH FREQUENCY.

SPECIFICATION forming part of Letters Patent No. 568,179, dated September 22, 1896.

Application filed July 6, 1896. Serial No. 598,130. (No model.)

*To all whom it may concern:*

Be it known that I, NIKOLA TESLA, a citizen of the United States, residing at New York, in the county and State of New York, have invented certain new and useful Improvements in Methods of and Apparatus for Producing Currents of High Frequency, of which the following is a specification, reference being had to the drawings accompanying and forming a part of the same.

The apparatus for producing electrical currents of very high frequency in which is embodied the invention of my present application involves as its chief element means for the periodic charging of a condenser or circuit possessing capacity by the energy of a given source and the discharge of the same through a circuit of low self-induction, whereby the rapid succession of impulses characteristic of a condenser discharge under such circumstances is made available for many practical and useful purposes.

The general arrangement of circuits and apparatus which I prefer for ordinary applications of this invention I have shown and described in an application filed by me April 22, 1896, Serial No. 588,534, as comprising a local circuit of high self-induction connected with a source of supply, a condenser, a discharge-circuit of low self-induction, and a circuit-controller operating to alternately effect the charging of the condenser by the energy stored in the circuit of high self-induction and its discharge through that of low self-induction. I have shown, however, in the application referred to as the source of supply a continuous-current generator, or in general a source of direct currents, and while the principle of operation and the general character of the apparatus remain the same whether the current of the source be direct or alternating, yet the economical utilization of the latter involves certain special principles and appliances which it is my present object to illustrate as the basis for the claims of invention made herein.

When the potential of the source periodically rises and falls, whether with reversals or not is immaterial, it is essential to economical operation that the intervals of interruption of the charging-current should bear a definite time relation to the period of the current, in order that the effective potential of the impulses charging the condenser may be as high as possible. I therefore provide, in case an alternating or equivalent electromotive force be employed as the source of supply, a circuit-controller which will interrupt the charging-circuit at instants predetermined with reference to the variations of potential therein. The most practicable means for accomplishing this of which I am aware is to employ a synchronous motor connected with the source of supply and operating a circuit-controller which interrupts the charging-current at or about the instant of highest potential of each wave and permits the condenser to discharge the energy stored in it through its appropriate circuit. This apparatus, which may be considered as typical of the means employed for carrying out the invention, I have illustrated in the accompanying drawings.

The figures are diagrammatic illustrations of the system in slightly-modified forms, and will be described in detail in their order.

Referring to Figure 1, A designates any source of alternating or equivalent current, from which lead off mains A' A'. At any point where it is desired to produce the high-frequency currents a branch circuit B is taken off from the mains, and in order to raise the potential of the current a transformer is employed, represented by the primary C and secondary D. The circuit of the secondary includes the energizing-coils of a synchronous motor E and a circuit-controller, which, in the present instance, in Fig. 1 is shown as composed of a metal disk F with insulated segments F' in its periphery and fixed to the shaft of the motor. An insulating-arm G, stationary with respect to the motor-shaft and adjustable with reference to the poles of the fixed magnets, carries two brushes H H, which bear upon the periphery of the disk. With the parts thus arranged the secondary circuit is completed through the coils of the motor whenever the two brushes rest upon the uninsulated segments of the disk and interrupted through the motor at other times. Such a motor, if properly constructed, in well-understood ways, maintains very exact synchronism with the alterations of the source, and the arm G may therefore be adjusted to interrupt the current at any determined point in its waves. It will be understood that by the proper relations of insulated and conducting segments and the motor-poles the current may be interrupted twice in each complete wave at or about the points of highest potential. The self-induction of the circuit containing the motor and controller should be high, and the motor itself will usually be constructed in such manner that no other self-induction device will be needed. The energy stored in this circuit is utilized at each break therein to charge a condenser K. With this object the terminals of the condenser are connected to the two brushes H H or to points of the circuit adjacent thereto, so that when the circuit through the motor is interrupted the terminals of the motor-circuit will be connected with the condenser, whereby the latter will receive the high-potential inductive discharge from the motor or secondary circuit.

The condenser discharges into a circuit of low self-induction, one terminal of which is connected directly to a condenser-terminal and the other to the brush H opposite to that connected with the other condenser-terminal, so that the discharge-circuit of the condenser will be completed simultaneously with the motor-circuit and interrupted while the motor-circuit is broken and the condenser being charged.

The discharge-circuit contains a primary M of a few turns, and this induces in a secondary N impulses of high potential, which by reason of their great frequency are available for the operation of vacuum-tubes P, single terminal-lamps R, and other novel and useful purposes.

It is obvious that the supply-current need not be alternating, provided it be converted or transformed into an alternating current before reaching the controller. For example, the present improvements are applicable to various forms of rotary transformers, as is illustrated in Figs. 2 and 3.

E' designates a continuous-current motor, here represented as having four field-poles wound with coils E'' in shunt to the armature. The line-wires B B connect with the brushes $b$ $b$, bearing on the usual commutator.

On an extension of the motor-shaft is a circuit-controller composed of a cylinder the surface of which is divided into four conducting-segments $c$ and four insulating-segments $d$, the former being diametrically connected in pairs, as shown in Fig. 3.

Through the shaft run two insulated conductors $e$ $e$ from any two commutator-segments ninety degrees apart, and these connect with the two pairs of segments $c$, respectively. With such arrangement it is evident that any two adjacent segments $c$ $c$ become the terminals of an alternating-current source, so that if two brushes H H be applied to the periphery of the cylinder they will take off current during such portion of the wave as the width of segment and position of the brushes may determine. By adjusting the position of the brushes relatively to the cylinder, therefore, the alternating current delivered to the segments $c$ $c$ may be interrupted at any point in its waves.

While the brushes H H are on the conducting-segments the current which they collect stores energy in a circuit of high self-induction formed by the wires $f$ $f$, self-induction coils S S, the conductors B B, the brushes, and commutator. When this circuit is interrupted by the brushes H H passing onto the insulating-segments of the controller, the high-potential discharge of this circuit charges the condensers K K, which then discharge through the circuit of low self-induction containing the primary M. The secondary circuit N contains any devices, as P R, for utilizing the current.

The mechanical construction of the circuit-controller may be greatly varied, and in other respects the details shown and described are merely given as typical illustrations of the nature and purpose of the invention.

What I claim is—

1. The method herein described of producing electric currents of high frequency, which consists in generating an alternating current, charging a condenser thereby during determinate intervals of each wave of said current, and discharging the condenser through a circuit of low self-induction, as herein set forth.

2. The combination with a source of alternating current, a condenser, a circuit-controller adapted to direct the current during determinate intervals of each wave into the condenser for charging the same, and a circuit of low self-induction into which the condenser discharges, as set forth.

3. The combination with a source of alternating current, a synchronous motor operated thereby, a circuit-controller operated by the motor and adapted to interrupt the circuit through the motor at determinate points in each wave, a condenser connected with the motor-circuit and adapted on the interruption of the same to receive the energy stored therein, and a circuit into which the condenser discharges, as set forth.

4. The combination with a source of alternating current, a charging-circuit in which the energy of said current is stored, a circuit-controller adapted to interrupt the charging-circuit at determinate points in each wave, a condenser for receiving, on the interruption of the charging-circuit, the energy accumulated therein, and a circuit into which the condenser discharges when connected therewith by the circuit-controller, as set forth.

NIKOLA TESLA.

Witnesses:
 M. LAWSON DYER,
 DRURY W. COOPER.